US010073914B2

(12) United States Patent
Cheng et al.

(10) Patent No.: US 10,073,914 B2
(45) Date of Patent: Sep. 11, 2018

(54) METHOD AND APPARATUS FOR TRANSMITTING SEARCH RESULT

(71) Applicant: BAIDU ONLINE NETWORK TECHNOLOGY (BEIJING) CO., LTD., Beijing (CN)

(72) Inventors: Hao Cheng, Beijing (CN); Kuan Zheng, Beijing (CN); Jian Gao, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 702 days.

(21) Appl. No.: 14/571,903

(22) Filed: Dec. 16, 2014

(65) Prior Publication Data
US 2015/0379137 A1 Dec. 31, 2015

(30) Foreign Application Priority Data
Jun. 27, 2014 (CN) .......................... 2014 1 0302176

(51) Int. Cl.
G06F 17/00 (2006.01)
G06F 17/30 (2006.01)
G06Q 30/06 (2012.01)

(52) U.S. Cl.
CPC .... *G06F 17/30867* (2013.01); *G06F 17/3087* (2013.01); *G06F 17/30864* (2013.01); *G06Q 30/0625* (2013.01); *G06Q 30/0641* (2013.01)

(58) Field of Classification Search
None
See application file for complete search history.

(56) References Cited

U.S. PATENT DOCUMENTS

| 7,996,282 | B1* | 8/2011 | Scott | G06Q 30/06 705/27.1 |
|---|---|---|---|---|
| 8,392,421 | B1 | 3/2013 | Nucci et al. | |
| 9,245,026 | B1* | 1/2016 | Hoover | G06F 17/30864 |
| 9,818,140 | B2* | 11/2017 | Inghelbrecht | G06Q 30/0621 |
| 2002/0073199 | A1 | 6/2002 | Levine et al. | |

(Continued)

FOREIGN PATENT DOCUMENTS

| CN | 101539943 A | 9/2009 |
|---|---|---|
| CN | 103744866 A | 4/2014 |

(Continued)

OTHER PUBLICATIONS

Liddy, How a Search Engine Works, Searcher, vol. 9, No. 5, available at http://web.archive.org/web/20100614022849/http://www/infotoday.com/searcher/may01/liddy.htm , Jun. 14, 2010.

*Primary Examiner* — William J Allen
*Assistant Examiner* — Maria S. P. Heath
(74) *Attorney, Agent, or Firm* — Hodgson Russ LLP (57) ABSTRACT

A method for displaying a search result and an apparatus for displaying a search result are provided. The method comprises: receiving a search term; obtaining a first search result and a second search result according to the search term, in which the first search result comprises overall information corresponding to the search term and the second search result comprises individual information corresponding to the search term; and displaying the first search result and the second search result.

16 Claims, 4 Drawing Sheets

(56) References Cited

U.S. PATENT DOCUMENTS

| | | | |
|---|---|---|---|
| 2006/0064411 A1* | 3/2006 | Gross | G06F 17/30864 |
| 2009/0171899 A1* | 7/2009 | Chittoor | G06Q 10/02 |
| 2011/0196801 A1 | 8/2011 | Ellis et al. | |
| 2013/0204879 A1 | 8/2013 | Zeng et al. | |
| 2015/0088921 A1* | 3/2015 | Somaiya | G06F 17/30864 |
| | | | 707/767 |

FOREIGN PATENT DOCUMENTS

| | | |
|---|---|---|
| JP | 2001229171 A | 8/2001 |
| JP | 2002099764 A | 4/2002 |
| JP | 2002207913 A | 7/2002 |
| JP | 2006163826 A | 6/2006 |
| JP | 2006209257 A | 8/2006 |
| JP | 2009223456 A | 10/2009 |
| JP | 2011100332 A | 5/2011 |
| JP | 2012526329 A | 10/2012 |

\* cited by examiner

METHOD AND APPARATUS FOR TRANSMITTING SEARCH RESULT

CROSS-REFERENCE TO RELATED APPLICATION

This application claims priority to and benefits of Chinese Patent Application Serial No. 201410302176.2, filed with the State Intellectual Property Office of P. R. China on Jun. 27, 2014, the entire content of which is incorporated herein by reference.

FIELD

The present disclosure relates to the field of communication technologies, and more particularly to a method for displaying a search result and an apparatus for displaying a search result.

BACKGROUND

A user often searches for desired information among massive amounts of information on the Internet, and a search engine gradually becomes an indispensable tool. In the purchase of a specific commodity by the user, there are procedures of querying a price, finding a purchase channel, ordering, paying, etc. Since the presence of massive amounts of information in every industry, the same commodity may be from different purchase channels with different prices.

In the related art, the search engine only displays fragmented information to the user, and the user needs to compare and analyze massive amounts of information, so that the experience of the user is poor.

SUMMARY

Embodiments of the present disclosure seek to solve at least one of the problems existing in the related art to at least some extent.

According to embodiments of a first aspect of the present disclosure, a method for displaying a search result is provided. The method comprises: receiving a search term from a user device; obtaining a first search result and a second search result according to the search term, in which the first search result comprises overall information corresponding to the search term and the second search result comprises individual information corresponding to the search term; and transmitting the first search result and the second search result to the user device.

With the method for displaying the search result according to embodiments of the present disclosure, by obtaining and displaying the first search result, it is possible to meet the overall requirement of the user for the entity described by the search term; and by obtaining and displaying the second search result, it is possible to meet the individual requirement of the user. Therefore, by transmitting the first search result and the second search result to the user device, not only may the overall information be displayed to the user, but also the distinguishing individual information may be displayed to the user, such that the user may obtain richer information conveniently so as to meet various requirements of the user, thus enhancing the experience of the user and increasing the stickiness of the user.

According to embodiments of a second aspect of the present disclosure, an apparatus for displaying a search result is provided. The apparatus comprises a receiving module configured to receive a search term from a user device; an obtaining module configured to obtain a first search result and a second search result according to the search term, in which the first search result comprises overall information corresponding to the search term and the second search result comprises individual information corresponding to the search term; and a displaying module configured to transmit the first search result and the second search result to the user device.

With the apparatus for transmitting the search result according to embodiments of the present disclosure, by obtaining and transmitting the first search result, it is possible to meet the overall requirement of the user for the entity described by the search term; and by obtaining and transmitting the second search result, it is possible to meet the individual requirement of the user. Therefore, by transmitting the first search result and the second search result to the user device, not only may the overall information be displayed to the user, but also the distinguishing individual information may be displayed to the user, such that the user may obtain richer information conveniently so as to meet various requirements of the user, thus enhancing the experience of the user and increasing the stickiness of the user.

According to embodiments of a third aspect of the present disclosure, a non-transitory computer readable storage medium is provided. The non-transitory computer readable storage medium comprises a computer program for executing the method for displaying the search result according to embodiments of the first aspect of the present disclosure, when running on a computer.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Reference will be made in detail to embodiments of the present disclosure. The embodiments described herein with reference to drawings are explanatory, illustrative, and used to generally understand the present disclosure. The embodiments shall not be construed to limit the present disclosure.

The same or similar elements and the elements having same or similar functions are denoted by like reference numerals throughout the descriptions.

Figure 1:
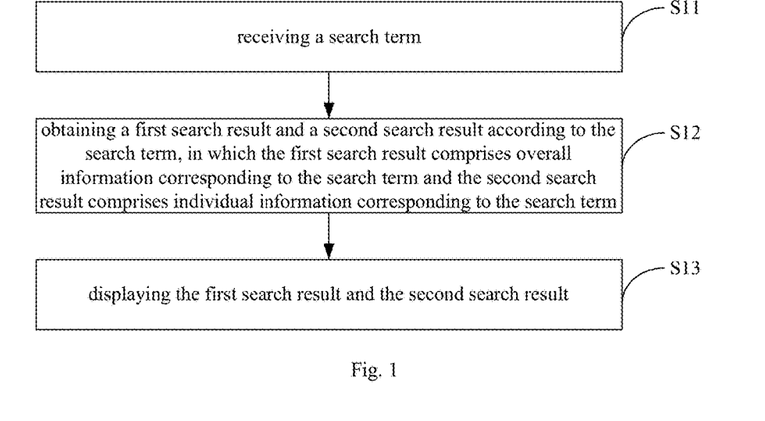
FIG. 1 is a flow chart of a method for transmitting a search result according to an embodiment of the present disclosure.

FIG. 1 is a flow chart of a method for transmitting a search result according to an embodiment of the present disclosure.

As shown in FIG. 1, the method for transmitting the search result comprises the following steps.

In step S11, a search term is received.

Specifically, the search term input by a user is received by a search engine of a client.

The search term input by the user may be a question type search term.

Specifically, the question type search term may be a search term for querying a price of a commodity. For example, the search term input by the user is "how much is a Siberian Husky".

In step S12, a first search result and a second search result are obtained according to the search term, in which the first search result comprises overall information corresponding to the search term and the second search result comprises individual information corresponding to the search term.

The first search result may be used to meet the overall requirement of the user for an entity described by the search term. Specifically, the overall information refers to overall price information of the commodity. For example, for the search term "how much is a Siberian Husky", the first search result may comprise the price range of the Siberian Husky.

The entity may be things which exist in the objective world and can be distinguished from each other. The entity may be a person, a physical object, or an abstract concept. For example, "Samoyed", "Siberian Husky" and the like belong to the entity.

Further, the overall information is obtained by aggregating a pre-acquired original data corresponding to the entity by a server. For example, the server collects a large amount of price data of the Siberian Husky and then aggregates the collected price data to obtain the price range of the Siberian Husky, and supplies the price range of the Siberian Husky to the search engine to display the price range of the Siberian Husky.

The second search result is used to meet the individual requirement of the user for the entity described by the search term. Specifically, the individual requirement may comprise a purchase channel requirement. For example, for the search term "how much is a Siberian Husky", the second search result may comprise the individual information of the Siberian Husky, in which the individual information comprises individual purchase channel information. For example, the second search result comprises information on a plurality of Huskies, such that the user may select one of the Huskies to purchase it.

In step S13, the first search result and the second search result are displayed.

The first search result and the second search result may be configured in such a way to be displayed in different regions. For example, the first search result may be configured to be displayed above the second search result.

In the related art, when the user searches for a price, the search engine only displays search results respectively, and the user needs to browse many search results and compare the search results many times to obtain relatively accurate price information. In addition, more inconveniently, after determining the price information, the user needs to constantly change the search term and to initiate searches many times to find a purchase channel. Therefore, as far as the user is concerned, in the related art, the search cost is high, the browse path is long, the obtained information is not comprehensive, or even the user may abandon the search because his/her requirement cannot be met, resulting in the user losing.

With the method for transmitting the search result according to embodiments of the present disclosure, by obtaining and transmitting the first search result, it is possible to meet the overall requirement of the user for the entity described by the search term; and by obtaining and transmitting the second search result, it is possible to meet the individual requirement of the user. Therefore, by transmitting the first search result and the second search result, not only may the overall information be displayed to the user, but also the distinguishing individual information may be displayed to the user, such that the user may obtain richer information conveniently so as to meet various requirements of the user, thus enhancing the experience of the user and increasing the stickiness of the user.

Figure 2:
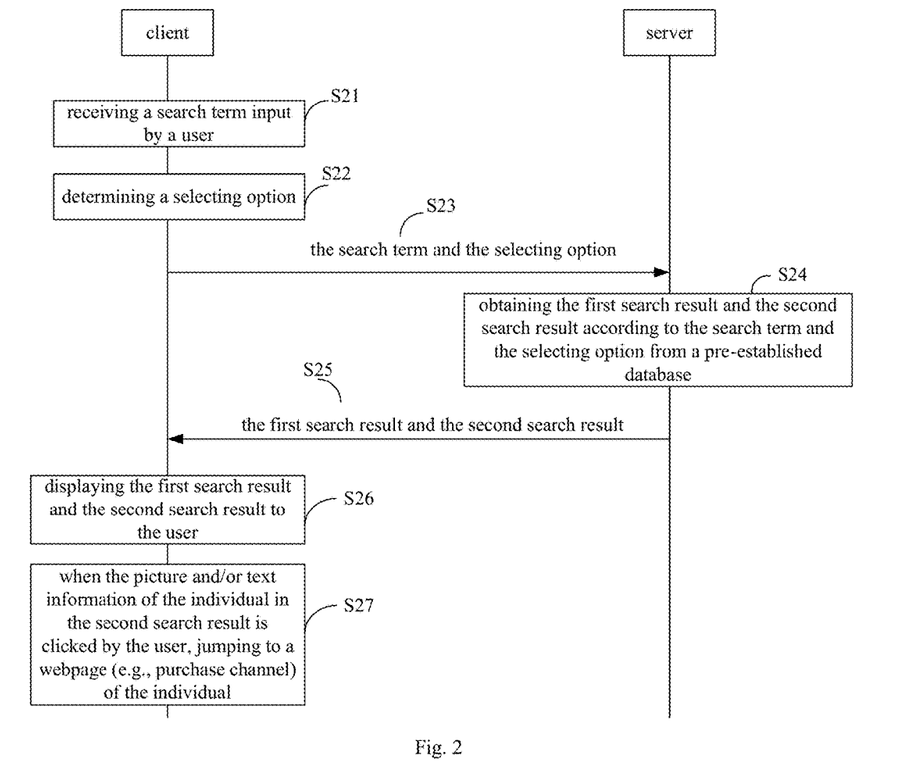
FIG. 2 is a schematic diagram illustrating a process of a method for transmitting a search result according to another embodiment of the present disclosure.

FIG. 2 is a schematic diagram illustrating a process of a method for transmitting a search result according to another embodiment of the present disclosure.

As shown in FIG. 2, the method for transmitting the search result comprises the following steps.

In step S21, a search engine receives a search term input by a user.

For example, the search term input by the user is "how much is a Siberian Husky".

The search engine may be located at a client. In this embodiment, the interaction between the search engine and a server to obtain a first search result and a second search result is taken as an example.

In step S22, the search engine determines a selecting option.

In some embodiments, the selecting option comprises at least one of a territory, a source, an age and a gender.

Figure 3:
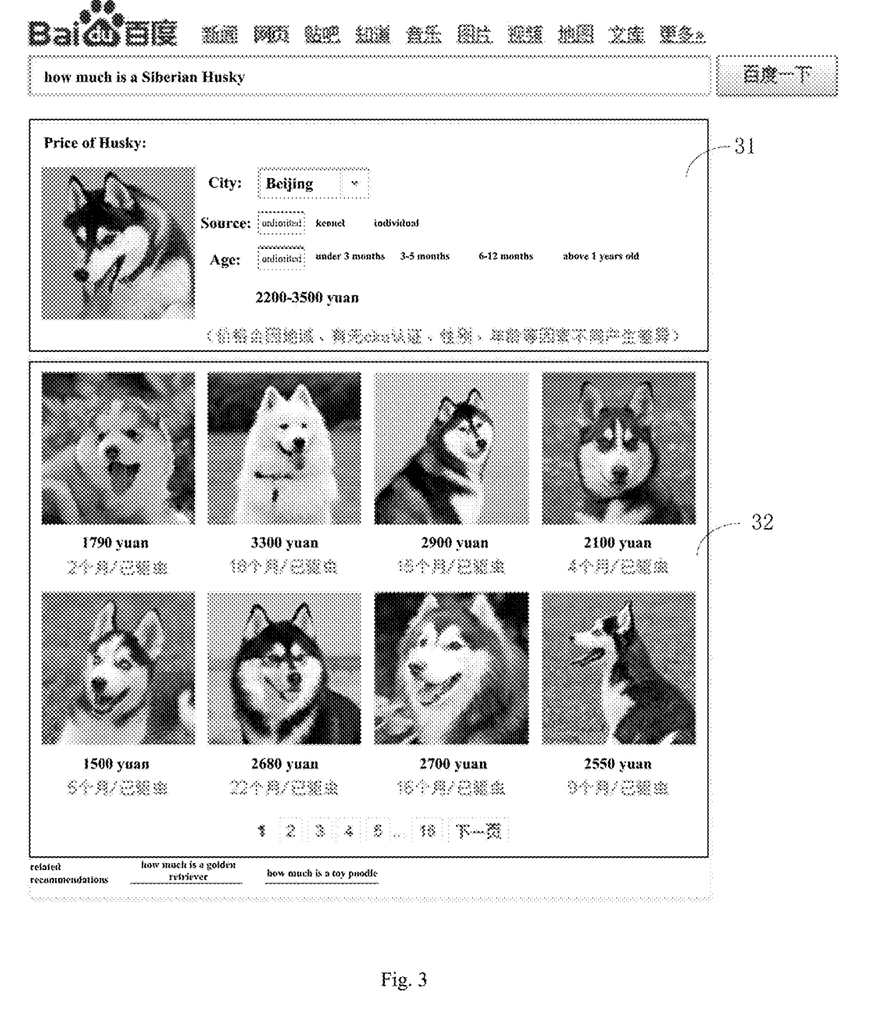
FIG. 3 is a schematic diagram illustrating the display of a transmitted search result according to an embodiment of the present disclosure.

Specifically, the search engine may determine the selecting option according to a selection of the user. For example, as shown in FIG. 3, the search engine may display a plurality of selecting options (e.g., a city, a source, and an age) to the user, such that the user may select desired contents from different selecting options.

Particularly, if the selecting option comprises the territory (e.g., a city), an IP (Internet Protocol) address of a device used by the user may be detected, and the territory is determined according to the IP address.

In step S23, the search engine sends the search term input by the user and the determined selecting option to the server.

In step S24, the server obtains the first search result and the second search result according to the search term and the selecting option from a pre-established database.

In some embodiments, a correspondence between an entity (e.g., a commodity) and the overall information (e.g., a price range) is stored in the database.

The price range may be obtained by aggregating original data corresponding to the commodity. The original data may comprise price information and purchase channel information of the individual commodity. Further, the original data may also comprise information on the individual commodity in other dimensions, e.g., a territory, an age, a source, a gender, etc.

Specifically, the server collects a large amount of original data corresponding to the commodity and then aggregates the collected original data to obtain the price range.

Specifically, the aggregating may comprise first performing a disambiguation by a predetermined strategy, and then merging the same commodity data to establish a database, since data names and terminology names of the commodity from different sellers may be different. The aggregated data of the commodity may be directly returned from the database, thus facilitating the query of the user.

Further, the server may perform the aggregating according to multidimensional information to determine price information corresponding to the selecting option. For example, for the price of a pet dog, the original data are aggregated according to a plurality of dimensions (e.g., a breed, a territory, a source, an age, etc.) to establish a database. Thus, the user may select information conveniently.

Further, the database is updated correspondingly after the original data is updated. For example, when new original data are added, the data in the database will be updated in time, so as to supply the newest price data to the user.

After the server performs the aggregating, a correspondence between the name of the commodity, multidimensional selecting information, the price of the commodity and the purchase channel may be established. With this correspondence, it is possible to determine the price information and the purchase channel information corresponding to the search term and the selecting option, i.e. to determine the first search result and the second search result according to the search term and the selecting option.

In step S25, the server sends the first search result and the second search result to the search engine.

In step S26, the search engine displays the first search result and the second search result to the user.

The first search result and the second search result may be displayed in different regions. As shown in FIG. 3, the first search result 31 is displayed in a region above the second search result 32.

Specifically, the first search result may further comprise a picture of the commodity described by the search term. As shown in FIG. 3, the first search result further comprises a picture of the Siberian Husky. The first search result displays an answer corresponding to the search term, i.e. an overall price range of the Siberian Husky, which is obtained by performing the aggregating according to multidimensional information, for example, including the name (e.g., dog breed) of the commodity described by the search term, information (e.g., city) displayed in the selecting option, a source (e.g., kennel or individual) of a dog, an age of the dog, etc. The user may obtain the corresponding price range by changing the selecting option.

The second search result may comprise picture and/or text information of an individual corresponding to the search term. As shown in FIG. 3, the second search result comprises picture and text information of a plurality of individual Huskies. The user may perform a further selection according to his/her preference for coat color, looks, etc.

Besides displaying the first search result and the second search result, related recommendations may be displayed. For example, referring to FIG. 3, related recommendations are displayed, for example, "how much is a golden retriever", and "how much is a toy poodle".

Figure 4:
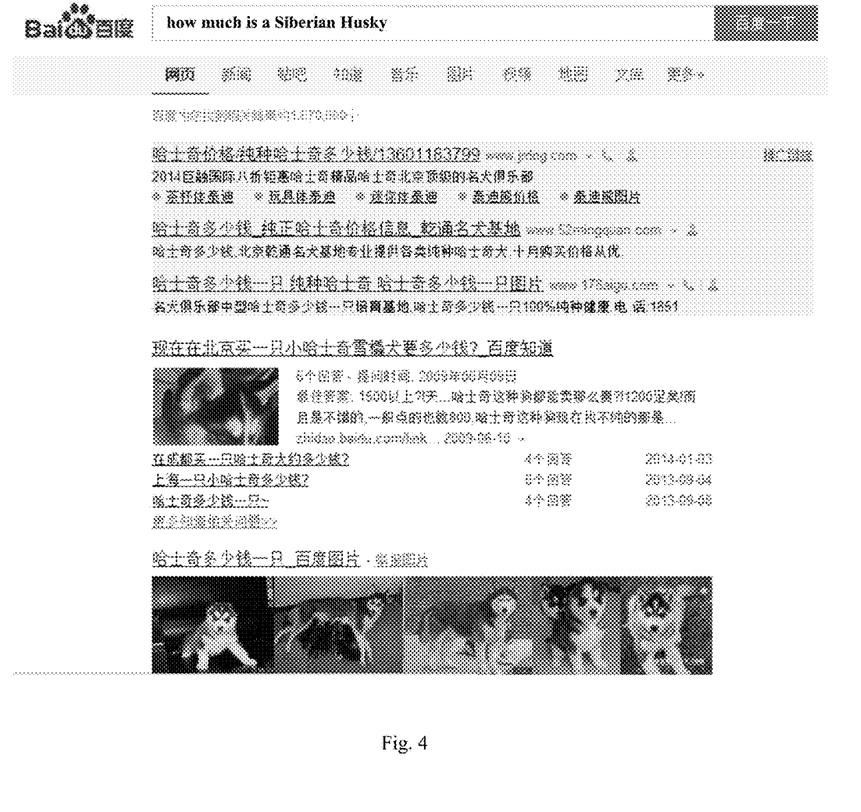
FIG. 4 is a schematic diagram illustrating the display of a transmitted search result in the related art.

In contrast, FIG. 4 is a schematic diagram illustrating the display of a search result in the related art. Referring to FIG. 4, in the related art, only answers from different persons may be given without overall price information. Compared with FIG. 4, in FIG. 3, it is possible to offer not only the overall price information (i.e. the price range of the Siberian Husky) but also the individual purchase channel information.

Further, when the picture and/or text information of the individual in the second search result is clicked, a corresponding purchase channel may be jumped to. That is, the method for displaying the search result may further comprise step S27.

In step S27, when the picture and/or text information of the individual in the second search result is clicked by the user, the search engine jumps to a webpage (e.g., purchase channel) of the individual.

For example, when the user clicks a picture of the Siberian Husky corresponding to 1790 yuan RMB in the second search result, it is possible to display a purchase channel of the Siberian Husky corresponding to 1790 yuan RMB, e.g., contact information of a seller, a specific description of the Siberian Husky, etc.

Furthermore, besides displaying the first search result and the second search result, search results in the related art may be displayed. For example, contents shown in FIG. 4 may also be displayed on the basis of FIG. 3.

With the method for transmitting the search result according to embodiments of the present disclosure, by obtaining and transmitting the first search result, it is possible to meet the price requirement of the user for the entity described by the search term; and by obtaining and transmitting the second search result, it is possible to meet the purchase channel requirement of the user, such that the user may neither need to compare the search results to determine the price information by himself/herself, nor need to initiate a new search after determining the price information to obtain purchase channel information. Therefore, it is possible to reduce the search and browse cost of the user in querying the price and selecting a purchase channel, thus enhancing the experience of the user and increasing the stickiness of the user.

With the method for transmitting the search result according to embodiments of the present disclosure, by identifying a target commodity of the user and aggregating industry-wide commodity price data on the Internet, it is possible to effectively reduce the cost of price comparison by browsing multiple Internet pages by the user. Meanwhile, pictures and purchase channels of the commodity are offered, thus saving the cost of multiple searches and price comparisons. Therefore, only if the user needs to express an interest in and demand for a commodity, he/she may find a suitable commodity and purchase channel in a one-stop manner with the method for displaying the search result according to embodiments of the present disclosure, thus greatly reducing the search and browse cost of the user.

With the method for transmitting the search result according to embodiments of the present disclosure, by performing the aggregating, it is possible to supply more efficient information; by updating the database, it is possible to ensure data accuracy; and by displaying pictures, it is possible to facilitate the view and selection of the user.

Figure 5:
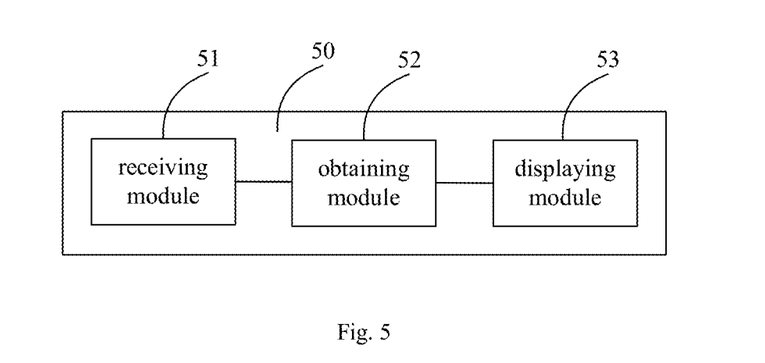
FIG. 5 is a block diagram of an apparatus for transmitting a search result according to an embodiment of the present disclosure.

FIG. 5 is a block diagram of an apparatus for transmitting a search result according to an embodiment of the present disclosure. As shown in FIG. 5, the apparatus 50 for transmitting the search result comprises a receiving module 51, an obtaining module 52 and a displaying module 53. The modules may be executed by one or more computing devices.

The receiving module 51 is configured to receive a search term from a user device.

The search term input by the user may be a question type search term.

Specifically, the question type search term may be a search term for querying a price of a commodity. For example, the search term input by the user is "how much is a Siberian Husky".

The obtaining module 52 is configured to obtain a first search result and a second search result according to the search term, in which the first search result comprises overall information corresponding to the search term and the second search result comprises individual information corresponding to the search term.

The first search result may be used to meet the overall requirement of the user for an entity described by the search term. Specifically, the overall information refers to overall price information of the commodity. For example, for the search term "how much is a Siberian Husky", the first search result may comprise the price range of the Siberian Husky.

The entity may be things which exist in the objective world and can be distinguished from each other. The entity may be a person, a physical object, or an abstract concept. For example, "Samoyed", "Siberian Husky" and the like belong to the entity.

Further, the overall information is obtained by aggregating a pre-acquired original data corresponding to the entity by a server. For example, the server collects a large amount of price data of the Siberian Husky and then aggregates the collected price data to obtain the price range of the Siberian Husky, and supplies the price range of the Siberian Husky to the search engine to display the price range of the Siberian Husky.

The second search result is used to meet the individual requirement of the user for the entity described by the search term. Specifically, the individual requirement may comprise a purchase channel requirement. For example, for the search term "how much is a Siberian Husky", the second search result may comprise the individual information of the Siberian Husky, in which the individual information comprises individual purchase channel information. For example, the second search result comprises information on a plurality of Huskies, such that the user may select one of the Huskies to purchase it.

In some embodiments, the overall information comprises overall price information, and the individual information comprises individual purchase channel information.

In some embodiments, the obtaining module 52 obtains the first search result corresponding to the search term from a pre-established database, in which a correspondence between the entity and the overall information is stored in the database.

In some embodiments, the overall information is obtained by aggregating original data corresponding to the entity (e.g., a commodity).

In some embodiments, the database is updated correspondingly after the original data is updated.

In some embodiments, a correspondence between the commodity and a price range may be stored in the database.

The price range may be obtained by aggregating original data corresponding to the commodity. The original data may comprise price information and purchase channel information of the individual commodity. Further, the original data may also comprise information on the individual commodity in other dimensions, e.g., a territory, an age, a source, a gender, etc.

Specifically, the server collects a large amount of original data corresponding to the commodity and then aggregates the collected original data to obtain the price range.

Specifically, the aggregating may comprise first performing a disambiguation by a predetermined strategy, and then merging the same commodity data to establish a database, since data names and terminology names of the commodity from different sellers may be different. The aggregated data of the commodity may be directly returned from the database, thus facilitating the query of the user.

Further, the server may perform the aggregating according to multidimensional information to determine price information corresponding to a selecting option. For example, for the price of a pet dog, the original data are aggregated according to a plurality of dimensions (e.g., a breed, a territory, a source, an age, etc.) to establish a database. Thus, the user may select information conveniently.

Further, the database is updated correspondingly after the original data is updated. For example, when new original data are added, the data in the database will be updated in time, so as to supply the newest price data to the user.

After the server performs the aggregating, a correspondence between the name of the commodity, multidimensional selecting information, the price of the commodity and the purchase channel may be established. With this correspondence, it is possible to determine the price information and the purchase channel information corresponding to the search term and the selecting option, i.e. to determine the first search result and the second search result according to the search term and the selecting option.

The displaying module 53 is configured to transmit the first search result and the second search result to the user device. The first search result and the second search result may be configured such The first search result and the second search result may be displayed in different regions. For example, the first search result is displayed above the second search result.

Specifically, the first search result may further comprise a picture of the commodity described by the search term. As shown in FIG. 3, the first search result further comprises a picture of the Siberian Husky. The first search result displays an answer corresponding to the search term, i.e. an overall price range of the Siberian Husky, which is obtained by performing the aggregating according to multidimensional information, for example, including the name (e.g., dog breed) of the commodity described by the search term, information (e.g., city) displayed in the selecting option, a source (e.g., kennel or individual) of a dog, an age of the dog, etc. The user may obtain the corresponding price range by changing the selecting option.

The second search result may comprise picture and/or text information of an individual corresponding to the search term. As shown in FIG. 3, the second search result comprises picture and text information of a plurality of individual Huskies. The user may perform a further selection according to his/her preference for coat color, looks, etc.

Besides transmitting the first search result and the second search result, related recommendations may be displayed. For example, referring to FIG. 3, related recommendations are displayed, for example, "how much is a golden retriever", and "how much is a toy poodle".

In the related art, when the user searches for a price, the search engine only displays search results respectively, and the user needs to browse many search results and compare the search results many times to obtain relatively accurate price information. In addition, more inconveniently, after determining the price information, the user needs to constantly change the search term and to initiate searches many times to find a purchase channel. Therefore, as far as the user is concerned, in the related art, the search cost is high, the browse path is long, the obtained information is not comprehensive, or even the user may abandon the search because his/her requirement cannot be met, resulting in the user losing.

With the apparatus for transmitting the search result according to embodiments of the present disclosure, by obtaining and transmitting the first search result, it is possible to meet the overall requirement of the user for the entity described by the search term; and by obtaining and displaying the second search result, it is possible to meet the individual requirement of the user. Therefore, by transmitting the first search result and the second search result, not only may the overall information be displayed to the user, but also the distinguishing individual information may be displayed to the user, such that the user may obtain richer information conveniently so as to meet various requirements of the user, thus enhancing the experience of the user and increasing the stickiness of the user.

Figure 6:
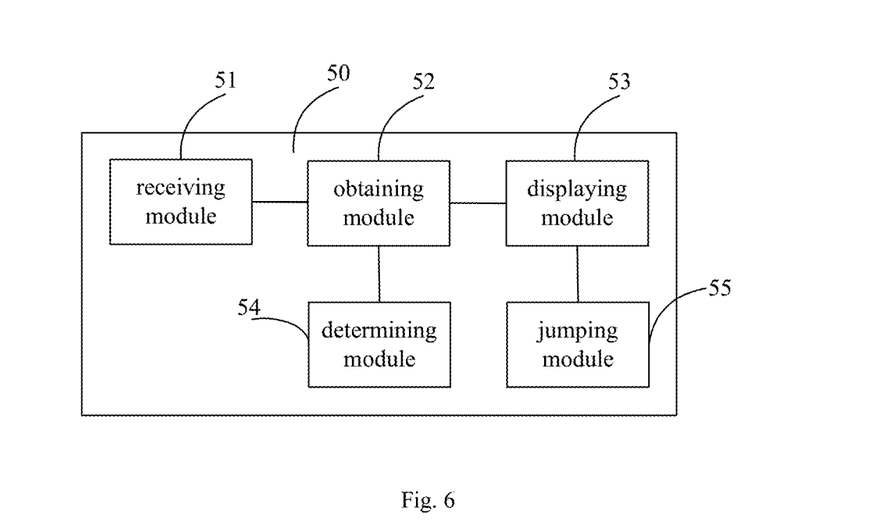
FIG. 6 is a block diagram of an apparatus for transmitting a search result according to another embodiment of the present disclosure.

FIG. 6 is a block diagram of an apparatus for transmitting a search result according to another embodiment of the present disclosure. The apparatus in this embodiment differs in that shown in FIG. 5 in that the apparatus 50 further comprises a determining module 54. In some embodiments, the first search result is transmitted to be displayed in a first region, and the first region comprises a selecting option. The determining module 54 is configured to determine the selecting option so as to determine the overall information corresponding to the selecting option.

In some embodiments, the selecting option comprises at least one of a territory, a source, an age and a gender.

In some embodiments, the determining module 54 determines the selecting option according to a selection; or if the selecting option comprises the territory, the determining module 54 detects an IP address of a device used and determines the territory according to the IP address.

Specifically, a search engine may determine the selecting option according to a selection of the user. For example, as shown in FIG. 3, the search engine displays a plurality of selecting options (e.g., a city, a source, and an age) to the user, such that the user may select desired contents from different selecting options.

Particularly, if the selecting option comprises the territory (e.g., a city), an IP (Internet Protocol) address of a device used by the user may be detected, and the territory is determined according to the IP address.

In some embodiments, the second search result comprises picture and/or text information of an individual corresponding to the search term, and the apparatus 50 further comprises a jumping module 55. The jumping module 55 is configured to jump to a webpage of the individual when the picture and/or text information of the individual in the second search result is clicked.

For example, when the user clicks a picture of the Siberian Husky corresponding to 1790 yuan RMB in the second search result, a webpage of the Siberian Husky corresponding to 1790 yuan RMB may be displayed, and it is possible to transmit to the user device on the webpage a purchase channel of the Siberian Husky corresponding to 1790 yuan RMB, e.g., contact information of a seller, a specific description of the Siberian Husky, etc.

With the apparatus for transmitting the search result according to embodiments of the present disclosure, by obtaining and transmitting the first search result, it is possible to meet the price requirement of the user for the entity described by the search term; and by obtaining and displaying the second search result, it is possible to meet the purchase channel requirement of the user, such that the user may neither need to compare the search results to determine the price information by himself/herself, nor need to initiate a new search after determining the price information to obtain purchase channel information. Therefore, it is possible to reduce the search and browse cost of the user in querying the price and selecting a purchase channel, thus enhancing the experience of the user and increasing the stickiness of the user.

With the apparatus for transmitting the search result according to embodiments of the present disclosure, by identifying a target commodity of the user and aggregating industry-wide commodity price data on the Internet, it is possible to effectively reduce the cost of price comparison by browsing multiple Internet pages by the user. Meanwhile, pictures and purchase channels of the commodity are offered, thus saving the cost of multiple searches and price comparisons. Therefore, only if the user needs to express an interest in and demand for a commodity, he/she may find a suitable commodity and purchase channel in a one-stop manner with the apparatus for transmitting the search result according to embodiments of the present disclosure, thus greatly reducing the search and browse cost of the user.

With the apparatus for transmitting the search result according to embodiments of the present disclosure, by performing the aggregating, it is possible to supply more efficient information; by updating the database, it is possible to ensure data accuracy; and by displaying pictures, it is possible to facilitate the view and selection of the user.

A non-transitory computer readable storage medium according to embodiments of the present disclosure is also provided. The non-transitory computer readable storage medium comprises a computer program configured to execute the method for transmitting the search result according to the above embodiments of the present disclosure, on one or more computing devices.

It should be noted that, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present disclosure, "a plurality of" means two or more than two, unless specified otherwise.

It will be understood that, the flow chart or any process or method described herein in other manners may represent a module, segment, or portion of code that comprises one or more executable instructions to implement the specified logic function(s) or that comprises one or more executable instructions of the steps of the progress. Although the flow chart shows a specific order of execution, it is understood that the order of execution may differ from that which is depicted. For example, the order of execution of two or more boxes may be scrambled relative to the order shown.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks, CD, etc.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A computer-implemented method for transmitting a search result, comprising:
    receiving, at one or more computing devices, a search term from a user device input into an internet search engine;
    determining, at one or more computing devices, that the search term corresponds to a search of a specific commodity;
    obtaining, at the one or more computing devices, a first search result and a second search result according to the search term, wherein the first search result comprises overall information corresponding to the search term and the second search result comprises individual information corresponding to the search term; and
    transmitting the first search result and the second search result to the user device;
    wherein the overall information comprises overall price information and the individual information comprises individual purchase channel information;
    wherein the first search result is configured to be displayed in a first region, and the first region comprises a selecting option, and the method further comprises;
    determining, at the one or more computing devices, the selecting option so as to determine the overall information corresponding to the selecting option;
    wherein the selecting option comprises at least one of a territory, a source, an age and a gender;
    wherein the overall information is obtained by aggregating pre-acquired original data from webpages, the original data comprises commodity name, price information and purchase channel information of commodities corresponding to the search term, the aggregating comprising: obtaining data associated with the search term corresponding to a commodity, and establishing a database based on the obtained data so that there is a correspondence in the database among the name of the commodity, the price information and the purchase channel for a respective commodity.

2. The method according to claim 1, wherein obtaining the first search result according to the search term comprises:
    obtaining, at the one or more computing devices, the first search result corresponding to the search term from a pre-established database, in which a correspondence between an entity and the overall information is stored in the database.

3. The method according to claim 2, wherein the overall information is obtained by aggregating original data corresponding to the entity.

4. The method according to claim 2, wherein the database is updated correspondingly, by the one or more computer devices, after the original data is updated.

5. The method according to claim 1, wherein determining the selecting option comprises:
    determining, at the one or more computing devices, the selecting option according to a selection; or
    detecting, at the one or more computing devices, an IP address of the user device and determining the territory according to the IP address, if the selecting option comprises the territory.

6. The method according to claim 1, wherein the second search result comprises picture and/or text information of an individual corresponding to the search term, and the method further comprises:
    transmitting a webpage of the individual, to the user device, when the picture and/or text information of the individual in the second search result is clicked.

7. A system for transmitting a search result, comprising:
    one or more computing devices configured to execute one or more software modules, the one or more software modules including:
    a receiving module configured to execute, by the one or more computing devices, to receive a search term from a user device input into an internet search engine;
    an obtaining module configured to execute, by the one or more computing devices, to obtain a first search result and a second search result according to the search term after it is determined that the search term corresponds to a search of a specific commodity, wherein the first search result comprises overall information corresponding to the search term and the second search result comprises individual information corresponding to the search term; and
    a displaying module configured to execute, by the one or more computing devices, to transmit the first search result and the second search result to the user device;
    wherein the overall information comprises overall price information and the individual information comprises individual purchase channel information;
    wherein the first search result is configured to be displayed in a first region of the user device, and the first region comprises a selecting option, the one or more software modules further including:
    a determining module configured to determine the selecting option so as to determine the overall information corresponding to the selecting option;
    wherein the selecting option comprises at least one of a territory, a source, an age and a gender;
    wherein the obtaining module is further configured to obtain overall information by aggregating pre-acquired original data from webpages, the original data comprises commodity name, price information and purchase channel information of commodities corresponding to the search term, the aggregating comprising: obtaining data associated with the search term corresponding to a commodity, and establishing a database based on the obtained data so that there is a correspondence in the database among the name of the commodity, the price information and the purchase channel for a respective commodity.

8. The system according to claim 7, wherein the obtaining module is configured to obtain the first search result corresponding to the search term from a pre-established database, in which a correspondence between an entity and the overall information is stored in the database.

9. The system according to claim 8, wherein the overall information is obtained by aggregating original data corresponding to the entity.

10. The system according to claim 8, wherein the database is updated correspondingly by the one or more computing devices after the original data is updated.

11. The system according to claim 7, wherein the determining module is further configured to perform one or more of the following: determine the selecting option according to a selection; and detect an IP address of the user device and determine the territory according to the IP address, if the selecting option comprises the territory.

12. The system according to claim 7, wherein the second search result comprises picture and/or text information of an individual corresponding to the search term, and the one or more software modules further including:

a jumping module configured to transmit a webpage of the individual on the user device when the picture and/or text information of the individual in the second search result is clicked.

13. A non-transitory computer readable storage medium, comprising a computer program configured to execute the following steps on one or more computing devices:

receiving a search term from a user device input into an internet search engine;

determining, at one or more computing devices, that the search term corresponds to a search of a specific commodity;

obtaining a first search result and a second search result according to the search term, wherein the first search result comprises overall information corresponding to the search term and the second search result comprises individual information corresponding to the search term; and transmitting the first search result and the second search result to the user device;

determining the selecting option so as to determine the overall information corresponding to the selecting option;

wherein the overall information comprises overall price information and the individual information comprises individual purchase channel information;

wherein the first search result is displayed in a first region, the first region comprises a selecting option, and the selecting option comprises at least one of a territory, a source, an age and a gender;

wherein the overall information is obtained by aggregating pre-acquired original data from webpages, the original data comprises commodity name, price information and purchase channel information of commodities corresponding to the search term, the aggregating comprising: obtaining data associated with the search term corresponding to a commodity, and establishing a database based on the obtained data so that there is a correspondence among the name of the commodity, the price information and the purchase channel for a respective commodity.

14. The method according to claim 1, wherein the selecting option includes all of the following: the territory, the source, the age, and the gender.

15. The method according to claim 14, wherein determining that the search term corresponds to a search of a specific commodity further comprises determining that the specific commodity is a domesticated animal.

16. The method according to claim 15, wherein the aggregating pre-acquired original data from webpages includes obtaining webpage-specific pictures of the domesticated animal for purchase; and wherein the webpage-specific pictures are configured to be displayed to the user.

* * * * *